US008825574B2

(12) United States Patent
Bodor et al.

(10) Patent No.: US 8,825,574 B2
(45) Date of Patent: Sep. 2, 2014

(54) PEER-TO-PEER MEDIA ITEM RECOMMENDATION SYSTEM WITH PEER INTERACTION INCLUDING CALCULATING A CORRELATION-BASED AND A DOMAIN-BASED RECOMMENDATION SCORE FOR A FRIEND

(76) Inventors: Robert Bodor, Plymouth, MN (US); Aaron Weber, Orono, MN (US)

( * ) Notice: Subject to any disclaimer, the term of this patent is extended or adjusted under 35 U.S.C. 154(b) by 860 days.

(21) Appl. No.: 12/892,320

(22) Filed: Sep. 28, 2010

(65) Prior Publication Data

US 2012/0078830 A1    Mar. 29, 2012

(51) Int. Cl.
*G06F 3/038* (2013.01)
*G06Q 30/02* (2012.01)
*G06F 17/30* (2006.01)

(52) U.S. Cl.
CPC .......... *G06F 17/30017* (2013.01); *G06Q 30/02* (2013.01)
USPC ................. 706/18; 706/20; 706/21; 707/733; 707/748; 707/749; 715/748; 715/751; 715/758; 715/759

(58) Field of Classification Search
USPC ..................................................... 706/46, 48
See application file for complete search history.

(56) References Cited

U.S. PATENT DOCUMENTS

| 2008/0243733 A1* | 10/2008 | Black ............................... 706/16 |
| 2009/0089273 A1* | 4/2009 | Hicks ................................. 707/5 |
| 2011/0184926 A1* | 7/2011 | Lee et al. ....................... 707/706 |

OTHER PUBLICATIONS

Vignoli et al., A Music Retrieval System Based on User-Driven Similarity and Its Evaluation [online], 2005 [retrieved on Mar. 28, 2013]. Retrieved from the Internet:<URL:http://bluecoat-02/?cfru=aHR0cDovL2lzbWlyMjAwNS5pc21pci5uZXQvcHJvY-2VlZGluZ3MvMTAyMS5wZGY=>.*

Wang et al., Wi-Fi Walkman: A wireless handhold that shares and recommend music on peer-to-peer networks [online], 2005 [retrieved on Oct. 3, 2013]. Retrieved from the Internet:<URL:http://www.google.com/url?sa=t&rct=j&q=&esrc=s&frm=1&source=web&cd=4&ved=0CDwQFjAD&url=http%3A%2F%2Fciteseerx.ist.psu.edu%2Fviewdoc%2Fdownload%3Fdoi%3D10.1.1.108.3459>.*

* cited by examiner

*Primary Examiner* — Jeffrey A Gaffin
*Assistant Examiner* — Nathan Brown, Jr.
(74) *Attorney, Agent, or Firm* — Dahl IP, LLC

(57) ABSTRACT

Peer-to-peer media item recommendations are provided by presenting a selected list of media items to a first user to consider for recommendation to a friend, receiving an indication from the first user that one or more of the presented media items are to be recommended to the friend, and presenting the one or more indicated media items to the friend. The presented list comprises media items the friend hasn't rated, and is selected using a media recommendation engine.

10 Claims, 5 Drawing Sheets

SEARCH FOR TITLE, ACTOR OR DIRECTOR

| HOME | MY SAVED | MY RECOMMENDED | ALL MOVIES & TV |

DIE HARD ~201

1988   132 MINUTES   CROWD 82   FRIENDS 82
RATED 100   SAVE   RECOMMEND   WATCH

DIE HARD

NYPD COP JOHN MCCLANE'S
(BRUCE WILLIS) PLAN TO
RECONCILE WITH HIS
ESTRANGED WIFE, HOLLY      202
(BONNIE BEDELIA)...

STARRING
BRUCE WILLIS, ALAN RICKMAN,
BONNIE BEDELIA...

RELATED VIDEO

GENRES
ACTION & ADVENTURE

DIRECTOR
JOHN MCTIERNAN

FRIENDS           BUY         RENT
                  AMAZON      NETFLIX
204 ~
   ROB    82
   STEVE  RECOMMEND

YOUR TASTE PROFILE | HELP | SETTINGS | SIGN OUT

RECOMMENDED TITLES SIMILAR TO DIE HARD

TYPE IN A SIMILAR TITLE TO RECOMMEND
TO SOMEONE WHO ENJOYS DIE HARD

RECOMMEND SIMILAR

WOULD YOU ALSO RECOMMEND THE FOLLOWING
SIMILAR TITLES TO SOMEONE WHO ENJOYS DIE HARD?

☐ LIVE FREE DIE HARD
   2007                        YES      NO

☐ CON AIR
   1997                        YES      NO

☐ DIE HARD WITH A VENGEANCE
   1995                        YES      NO

☐ DIE HARD 2: DIE HARDER
   1990                        YES      NO

☐ G.I. JOE THE RISE OF COBRA
   2009                        YES      NO

☐ THE TERMINATOR
   1984                        YES      NO

203 — HELP US GET SMARTER. ARE THE TITLES BELOW ALSO GOOD
SIMILAR TITLES TO RECOMMEND TO SOMEONE WHO LIKES DIE HARD?

☐ SWEET JUSTICE
   1992                        YES      NO

☐ THE HUNT FOR EAGLE ONE: CRASH POINT
   2006                        YES     (NO)

☐ FIELD OF DREAMS
   1989                        YES      NO

☐ SHOOT TO KILL
   1988                       (YES)     NO

☐ PRIDE FC: THE RETURN OF THE WARRIORS
   2001                        YES      NO

☐ GROUNDHOG DAY
   1993                        YES     (NO)

*Fig.2*

TITLES TO RECOMMEND TO MICHAEL

301 —

| FANTASTIC MR. FOX | THE BAADER MEINHOF COMPLEX | JUDGMENT AT NUREMBURG | WALT DISNEY'S THE JUNGLE BOOK | COOL HAND LUKE |
|---|---|---|---|---|
| [RECOMMEND] ROB [SAVED] | [RECOMMEND] ROB [SAVED] | [RECOMMEND] ROB [SAVED] | [RECOMMEND] ROB [100] | [RECOMMEND] ROB [100] |

302 — WHICH TITLES WOULD MICHAEL LIKE?

| BOURNE IDENTITY | THE BIG LEBOWSKI | THE GOOD THE BAD AND THE UGLY |
|---|---|---|
| [RECOMMEND] | [RECOMMEND] | [RECOMMEND] |

TITLES YOU AND MICHAEL SHOULD EXPERIENCE TOGETHER

303 —

| MAD MAX | DHERE DEVIL | OLD SCHOOL | HORTON HEARS A WHO | NATIONAL TREASURE |
|---|---|---|---|---|
| [SAVE] | [SAVE] | [SAVE] | [SAVE ⊗] | [SAVE] |

*Fig. 3*

PEER-TO-PEER MEDIA ITEM RECOMMENDATION SYSTEM WITH PEER INTERACTION INCLUDING CALCULATING A CORRELATION-BASED AND A DOMAIN-BASED RECOMMENDATION SCORE FOR A FRIEND

FIELD

The invention relates generally to a media recommendation engine, and more specifically to a media recommendation system and method employing peer-based input in recommendations.

BACKGROUND

The rapid growth of the Internet and the proliferation of inexpensive digital media devices have led to significant changes in the way media is bought and sold. Online vendors provide music, movies, and other media for sale on websites such as Amazon, for rent on websites such as Netflix, and available for person-to-person sale on websites such as EBay. The media is often distributed in a variety of formats, such as a movie available for purchase or rental on a DVD or Blu-Ray disc, for purchase and download, or for streaming delivery to a computer, media appliance, or mobile device.

Internet companies that provide media such as music, books, and movies derive profit from their sales, and it is in their best interest to sell customers multiple items or subscriptions to provide an ongoing stream of profits. Netflix, for example, provides a subscription service to customers enabling them to rent or stream movies, and profits as long as subscribers continue to find enough new movies to watch to remain a subscriber. Pandora provides streaming audio in a customized music station format based on a customer's music preferences, deriving profit from either subscriptions or from advertising placed in limited free services. Amazon derives the majority of its profits from sale of physical media, and increases its profit from providing a customer with media recommendations similar to items that a customer has already purchased.

These media recommendations are typically made by employing a recommendation engine to identify media that is similar to other media in which a customer has shown an interest in, such as by purchasing, renting, or rating other media. Pandora, for example, uses an expert's characterization of a song using attributes such as structure, instrumentation, rhythm, and lyrical content to produce domain knowledge data for each song, and provides streaming songs matching identified customer preferences for one or more distinct customized stations based on its domain knowledge-based recommendation engine. Other media providers such as Netflix provide correlation-based recommendations, where user preferences for similar movies over a broad base of users and media are used to find preference correlation between the media and users in the database to recommend media correlated to other media a customer has liked.

Because the number of items purchased or the length of a subscription are related to the value a customer receives in continuing to interact with a media provider, it is in the provider's best interest to provide media recommendations that are accurate and well-suited to its customers. It is therefore desirable to provide the best quality media recommendations possible in a variety of media commerce environments.

SUMMARY

One example embodiment of the invention comprises a peer-to-peer media item recommendation system. Recommendations are provided by presenting a selected list of media items to a first user to consider for recommendation to a friend, receiving an indication from the first user that one or more of the presented media items are to be recommended to the friend, and presenting the one or more indicated media items to the friend. The presented list comprises media items the friend hasn't rated, and is selected using a media recommendation engine.

In a further embodiment, domain knowledge similarity ranking for pairings of media items are derived from input from users regarding whether they would recommend a first media item of the media item pair to someone who enjoyed the second media item of the media item pair.

BRIEF DESCRIPTION OF THE FIGURES

FIG. 2 is a screen image illustrating derivation of domain knowledge media information from user recommendation of similar media items, consistent with an example embodiment of the invention.

FIG. 3 shows examples of screen presentations prompting a user for media item recommendations to a friend, consistent with an example embodiment of the invention.

DETAILED DESCRIPTION

Figure 1:
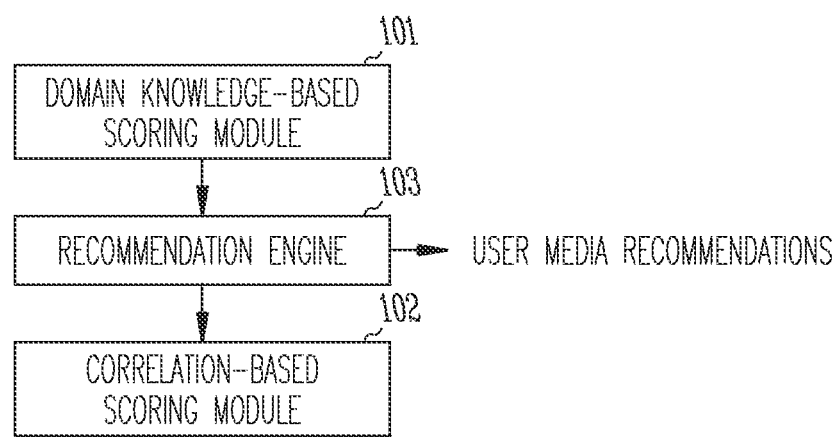
FIG. 1 shows a media recommendation system in which a user media recommendation is derived from domain knowledge-based and correlation-based recommendation scoring, consistent with an example embodiment of the invention.

In the following detailed description of example embodiments of the invention, reference is made to specific example embodiments of the invention by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention.

Features or limitations of various embodiments of the invention described herein, however essential to the example embodiments in which they are incorporated, do not limit other embodiments of the invention or the invention as a whole, and any reference to the invention, its elements, operation, and application do not limit the invention as a whole but serve only to describe these example embodiments. Features or elements shown in various examples described herein can be combined in ways other than shown in the examples, and any such combination is explicitly contemplated to be within the scope of the invention. The following detailed description does not, therefore, limit the scope of the invention, which is defined only by the appended claims.

Recommendation of media such as books, movies, or music that a customer is likely to enjoy can improve the sales of websites such as Amazon, improve the subscription rate and duration of rental services such as Netflix, and help the utilization rate of advertising-driven services such as Pandora. Although each of these examples derive their revenue from providing media in different ways, they all benefit from providing good quality recommendations to customers regarding potential media purchases, rentals, or other use. Similarly, knowledge of a user's preferences and interests can help target advertising that is relevant to a particular user, such as advertising horror movies only to those who have shown an interest in honor films, targeting country music advertising toward those who prefer country to rap or pop music, and presenting book advertising to those who have shown a preference for similar books.

Media recommendations such as these are typically made by employing a recommendation engine to identify media that is similar to other media in which a customer has shown an interest in, such as by purchasing, renting, or rating other media. Some websites, such as Netflix, ask a user to rank dozens of movies upon enrollment so that the recommendation engine can provide meaningful results. Other websites such as Amazon rely more upon a customer's purchase history and items viewed during shopping. Pandora differs from these approaches in that a user can rate relatively few pieces of media, and is provided a broad range of potentially similar media based on domain knowledge of the selected media items.

Pandora achieves this by using an expert's characterization of a song using attributes such as structure, instrumentation, rhythm, and lyrical content to produce domain knowledge data for each song, and provides streaming songs matching identified customer preferences for one or more distinct customized stations based on its domain knowledge-based recommendation engine. Other media providers such as Netflix provide correlation-based recommendations, where user preferences for similar movies over a broad base of users and media are used to find preference correlation between the media and users in the database to recommend media correlated to other media a customer has liked.

Correlation-based recommendation engines typically look at each user and their score correlation to other users, with no further knowledge of the users or movies being ranked. For example, first and second users may have similar preferences in action movies, but an unknown level of correlation in romantic comedies. Given that the first and second user's correlation is strong among movies they have both reviewed, the second user may likely be recommended a movie that the first user has rated high, possibly including a romantic comedy, rather than an action movie the first user has rated as average.

This overlooks the lack of knowledge regarding the second user's preferences for romantic movies. One may even reasonably infer that because the second user has not rated any romantic movies, it is a genre that the user does not prefer to view, and so recommending a romantic comedy to the second user is likely but not particularly meaningful.

Correlation based methods such as these do not encode domain knowledge, such as movie genre, and so are unable to make a recommendation based on such factors. Further, the movie genre is itself a movie characteristic that is fairly broad, and has limited usefulness in predicting or recommending other media. User tastes can be very subtle, so services that do rely upon domain knowledge characteristics such as Pandora typically rely on tens of different media characteristics to make recommendations.

In a domain knowledge-based system such as Pandora, a number of qualitative characteristics of each media item are generated and stored in a table. Using movies as an example, several characteristics in various categories may be employed, such as a "mood" category that lists a variety of mood characteristics including suspenseful, clever, bleak, and scary, which can be used to distinguish one type of movie from another. Other categories of characteristics include plot, genre, style, and other such categories, such that a wide range of characteristics are known for each media item in the media database.

Domain knowledge-based systems such as these are somewhat problematic in practice in that Pandora's method requires manual classification or rating of each media item by at least one expert, and may require different experts for each genre or multiple experts per item to produce consistently accurate results. It can also result in a problem that has plagued Pandora's widespread acceptance, in that the recommendation engine becomes good at recommending media that is all very similar but can be poor at suggesting interesting new media that is not very nearly the same as prior media.

One example of a recommendation engine constructed to address some problems with currently existing recommendation engines such as these is shown in FIG. 1. Here, a domain knowledge-based scoring module shown at 301 provides a domain knowledge-based score for media items, and a correlation-based scoring module provides a correlation-based score as shown at 302. A recommendation engine 303 employs the scores from both the domain knowledge-based scoring module and the correlation-based scoring module, producing a recommendation score for the media items for particular users.

Combination of the correlation-based scores and domain knowledge-based scores is a function of the two scores, which in various embodiments are multiplied, added, averaged, or otherwise processed such that both the correlation-based score and domain knowledge-based score are considered in combination to produce a user recommendation score that can be used to select media to recommend to a particular user. In further embodiments, the recommendation scores are combined in non-linear ways, such as using the domain knowledge ranking score between media item pairs as a filter on correlation scores.

In a more detailed example, a media library is processed user by user, computing a recommendation engine score for each media item not previously viewed or ranked by each user, and those media items having the highest recommendation scores are identified for recommendation to the user. In an alternate embodiment, only media items meeting an initial screening criteria, such as meeting a minimum threshold for the domain knowledge-based scoring module (or for the correlation-based scoring module) are fully evaluated to produce a recommendation engine score, avoiding spending scoring resources on media that is statistically improbable or impossible to have a high enough recommendation engine score to be recommended to a particular user.

In a more detailed example, a variety of algorithms are considered, or the variables in an algorithm are weighted, to optimize the recommendation algorithm both for the user base as a whole and for each user. Performance of an algorithm can be evaluated implicitly such as by observing user behavior, or explicitly such as by asking the user to rate the results of each of two or more algorithms.

In a further example, users may be clustered into groups that are found to fit various algorithms particularly well, such that each user may be associated with one of several correlation algorithms that best predict the user's preferences. Algorithms vary based on a variety of characteristics and weightings, such as similarity to favorite movies, popularity of movies among the user base, current activity for a movie, and other such factors.

Some embodiments of the invention seek to improve upon the performance of recommendation engines such as these by employing user-provided recommendations and other peer-derived input to improve media recommendations. In one such example, the domain knowledge-based scoring module 101 employs user inputs regarding similarity between movies rather than expert input to determine the relevant characteristics of movies.

FIG. 2 shows an example screen shot of such a system, consistent with an example embodiment of the present invention. Here, characteristics are not explicitly listed and ranked as in domain knowledge-based systems such as Pandora, but movies are paired as having a similar desirability to users by the users themselves. The user has selected the movie Die Hard here as shown at 201 and has already rated the movie, and so the user is prompted to indicate which of a list of potentially similar movies the user would or would not recommend to someone who liked Die Hard at 202. The user in this example is further prompted to indicate whether certain less well-known movies are similar to Die Hard at 203, enabling the recommendation system to determine that similar movies such as Shoot to Kill should be moved to the user recommendation list at 202 while relatively unrelated movies such as Groundhog Day should potentially be excluded from further recommendation.

If a movie doesn't have a similarity pair ranking with another movie, a "rough" or estimated ranking is also determined in some embodiments using the information that is available, such as known similarity rankings between a third movie and each of the movies in the pair or by using media item meta-data such as genre.

In a further example embodiment of the invention, media recommendations are made directly between users, such as to other users on a user's "friends" list. Referring again to FIG. 2, the movie Die Hard has been selected by a user at 201. At 204, the user is able to view how other friends who have elected to share their ratings with friends have rated the movie. User Rob has seen the movie, and rated it an 82 out of 100, while user Steve has not seen the movie. The user logged in therefore has the option of clicking "Recommend" associated with Steve's user ID, recommending the movie to Steve. In a further example, the user logged in can type a note or message accompanying the movie recommendation provided to Steve. The movie recommendation is received by Steve in any of several formats, such as receiving the movie on his "Recommended" list, receiving the recommendation via an email message, or receiving the recommendation in a "Friends' Recommendations" queue.

The recommendations provided to friends can be selected from a media item presentation, such as is shown in FIG. 2, or from a screen or portion of a screen presentation prompting a user to make a recommendation to a friend. FIG. 3 shows examples of screen presentations prompting a user for media item recommendations to a friend, consistent with an example embodiment of the invention.

At 301, a bar such as may be placed at the top, bottom, or elsewhere within a screen presentation of a website prompts a user Rob to recommend one of six different movies to a known friend, Michael. The user Rob has saved the first three movies in the list, and has provided favorable ratings for the last three movies in the list. In a further embodiment, the movies are selected as the movies Rob has rated or saved that a recommendation engine believes Michael is most likely to enjoy. Rob can recommend any or all of the selected movies to Michael by clicking the "Recommend" button associated with each movie at 301.

An alternate view of such a recommendation prompt is shown at 302, having fewer items listed for recommendation but taking significantly less screen space. This can be important when such a recommendation prompt is presented in the context of a web page directed to other tasks, where it is desirable to use the majority of the screen image space to perform other tasks.

At 303, the user Rob is prompted to select from among six movies that the recommendation engine predicts that both Rob and Michael will both like. Rob can save the movie in his "Saved" list by clicking the save button associated with each movie, and in another embodiment can recommend the movie to Michael by clicking a "Recommend we View Together" button associated with each movie or other media item. In the example illustrated here, Rob's selection of a movie to save also creates a recommendation to Michael from Rob, or alternatively saves the movie to Michael's "Saved" list with a notation that Rob selected the for entry into Michael's saved list for viewing together.

Because the recommendation engine can score every media item for every user, the recommendation engine is able to suggest movies that a given user is particularly likely to enjoy. Use of media item scores for two or more users can further be used in various embodiments to find recommended movies that two or more people will all enjoy, such as recommending a movie for a date or recommending a movie for a group of people gathering for a "movie night". The recommendation engine in some embodiments will only recommend a movie that the two or more people have not rated, as it can be assumed that a user will already have seen a movie they have rated. In an alternate embodiment, the engine may recommend a movie that one or more people in a group have rated, particularly if such a movie has a higher rating for the group than movies that no user in the group has rated.

Figure 4:
FIG. 4 shows an example user's recommended movies page, consistent with an example embodiment of the invention.

FIG. 4 shows an example user's recommended movies page, consistent with an example embodiment of the invention. Here, a user's recommended movies are listed in order, sorted by the recommendation engine's personalized ranking for each of the recommended movies for the user, as selected at 401. The first movie in the list is Schindler's List at 402, which is recommended to the user Steve first because it has the highest recommendation engine ranking for Steve among movies that Steve has not rated or already saved. The movie is further indicated to be identified by the recommendation engine as being similar to Defiance, a movie that Steve has indicated he liked, at 403. At 404, a notation indicates that Steve's friend Bob has rated the movie a 95 out of 100.

The second movie in the list, The Matrix, is shown at 405. The movie is indicated as having been recommended to Steve by Steve's friend Bob at 406, along with a presentation of a variety of other information regarding the movie such as the user base's combined movie rating of 84 and Steve's friends' combined rating of 90 for the movie. Similarly, the third movie, Pale Rider, is shown at 407, along with a notation that Steve's friend Bob has recommended that Bob and Steve view the movie together at 408.

Figure 5:
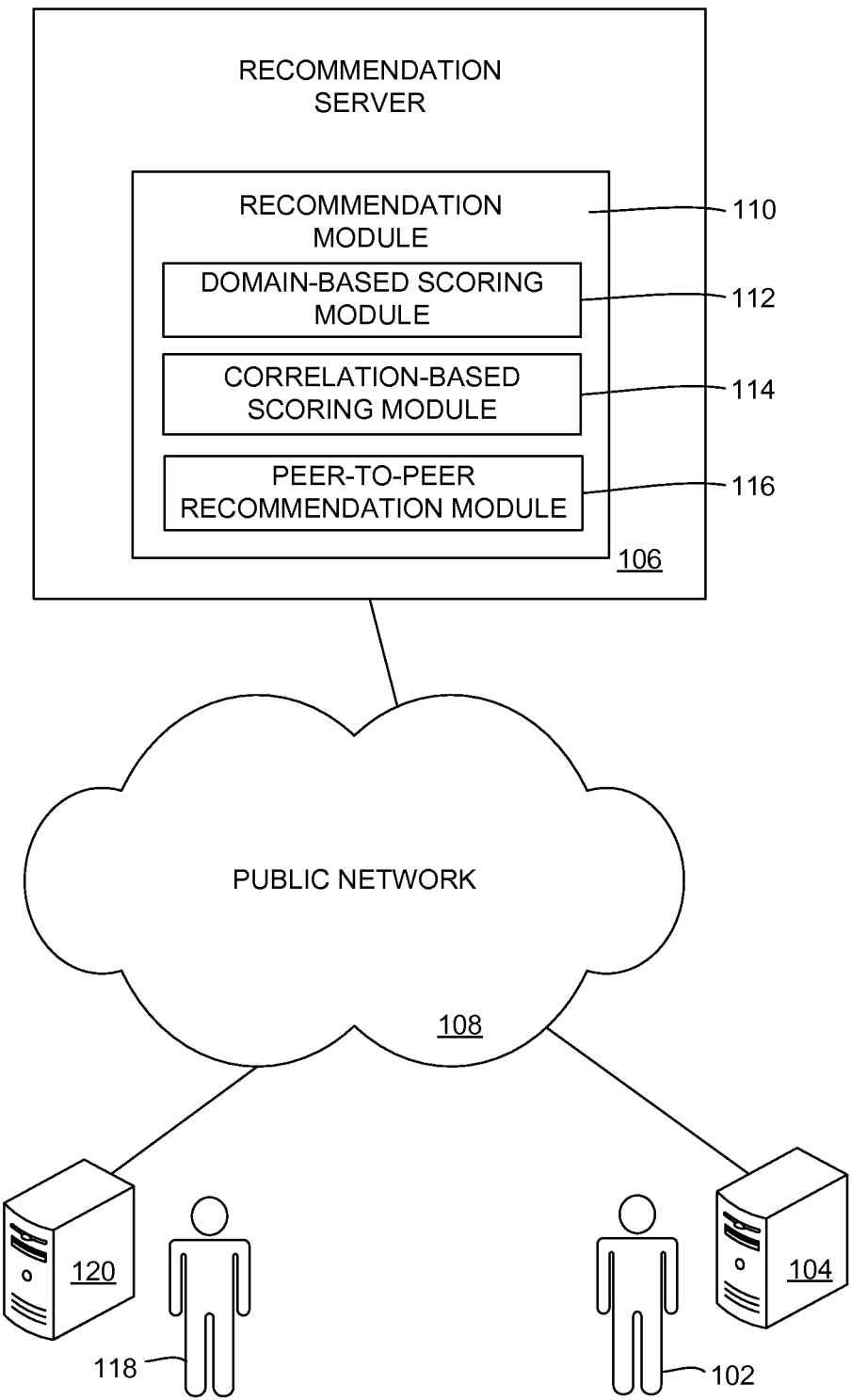
FIG. 5 shows a user and a friend interacting with a recommendation system, consistent with an example embodiment of the invention.

FIG. 5 shows a user and a friend interacting with a recommendation system, consistent with an example embodiment of the invention. Here, a user 102 uses computer 104 to access recommendation server 106 via public network 108, such as the Internet. Recommendation server 106 comprises a recommendation module 110 having a domain-based scoring module 112, a correlation-based scoring module 114, and a peer-to-peer recommendation module 116. Friend 118 similarly accesses recommendation server 106 via computer 120 and public network 108.

In operation, the peer-to-peer recommendation module 116 presents a selected list of media items to user 102 to consider for recommendation to friend 118. The peer-to-peer recommendation module receives an indication from the first user that one or more of the presented media items are to be recommended to the friend, and presents the one or more indicated media items to the friend.

In some embodiments, recommendation module 110 comprises program instructions executable on a processor of recommendation server 106.

In further examples, the user can customize the presentation of recommended movies using movie characteristics or meta-data such as rating, genre, actor, or other such characteristics. Customized preferences such as these are employed in some embodiments as strict filters, while in other embodiments they are applied as weightings to the recommendation engine such that all movies in the database still have a recommendation score and are ranked in order.

Because the recommendation in these examples is coming from a friend of the user receiving the recommendation rather than simply being machine-generated, there is a greater chance that the user receiving the recommendation will enjoy the movie. The receiving user's friends typically know the receiving user in person, and are anticipated to have knowledge about the receiving user that is not easily captured by a recommendation engine alone. The friend-endorsed or friend-provided recommendations are therefore likely to be more compelling to a receiving user, resulting in a greater likelihood of the receiving user viewing and enjoying the recommended media. Use of peer-to-peer recommendations has also been shown to be useful in other contexts, such as in identifying movies that two or more people may enjoy together, and developing a user-driven domain knowledge of similarity between media items.

Although specific embodiments have been illustrated and described herein, any arrangement that achieve the same purpose, structure, or function may be substituted for the specific embodiments shown. This application is intended to cover any adaptations or variations of the example embodiments of the invention described herein. It is intended that this invention be limited only by the claims, and the full scope of equivalents thereof.

What is claimed is:

1. A method of providing a peer-to-peer media item recommendation, comprising:
   presenting a selected list of media items to a first user to consider for recommendation to a friend;
   receiving an indication from the first user that one or more of the presented media items are to be recommended to the friend; and
   presenting the one or more indicated media items to the friend;
   wherein the selected list of media items comprises a list of media items presented in a ranked order derived from at least one of:
      calculating a correlation-based recommendation score for the friend for the media items; and
      calculating a domain-based recommendation score for the friend for the media items.

2. A method of providing a peer-to-peer media item recommendation, comprising:
   presenting a selected list of media items to a first user to consider for recommendation to a friend;
   receiving an indication from the first user that one or more of the presented media items are to be recommended to the friend; and
   presenting the one or more indicated media items to the friend;
   wherein receiving an indication from the first user comprises the user selecting the one or more media items from a list of media items having the highest predicted rating score for a friend for which the friend hasn't rated the media item.

3. A method of providing a peer-to-peer media item recommendation, comprising:
   presenting a selected list of media items to a first user to consider for recommendation to a friend;
   receiving an indication from the first user that one or more of the presented media items are to be recommended to the friend; and
   presenting the one or more indicated media items to the friend;
   wherein the one or more indicated media items are presented to the friend as a media item object in at least one of a message inbox, a recommended items list, and a friends' recommendations list.

4. A method of providing a peer-to-peer media item recommendation, comprising:
   presenting a selected list of media items to a first user to consider for recommendation to a friend;
   receiving an indication from the first user that one or more of the presented media items are to be recommended to the friend; and
   presenting the one or more indicated media items to the friend;
   wherein receiving an indication from the first user that one or more of the presented media items are to be recommended to the friend comprises receiving an indication from the first user that the first user believes the media item would be enjoyed by the first user and the friend viewing the media item together; and
   wherein presenting the one or more indicated media items to the friend comprises presenting the one or more indicated items with a notation that the first user believes the media item would be enjoyed by the first user and the friend viewing the media item together.

5. A method of providing a peer-to-peer media item recommendation, comprising:
   presenting a selected list of media items to a first user to consider for recommendation to a friend;
   receiving an indication from the first user that one or more of the presented media items are to be recommended to the friend; and
   presenting the one or more indicated media items to the friend;
   wherein presenting a selected list of media items to a first user to consider for recommendation to a friend comprises presenting a list of media items that a recommendation engine has scored as a good recommendation for both the friend and the first user.

6. A peer-to-peer media item recommendation system, comprising:
   a processor;
   a media recommendation module operable to present a selected list of media items to a first user to consider for recommendation to a friend; and
   a peer-to-peer recommendation module operable to receive an indication from the first user that one or more of the presented media items are to be recommended to the friend, and to present the one or more indicated media items to the friend;
   wherein the selected list of media items comprises a list of media items presented in a ranked order derived from at least one of:
      calculating a correlation-based recommendation score for the friend for the media items; and calculating a domain-based recommendation score for the friend for the media items; and wherein at least one of the media recommendation module and peer-to peer recommendation module comprises program instructions executable on the processor.

7. A peer-to-peer media item recommendation system, comprising:

a processor;

a media recommendation module operable to present a selected list of media items to a first user to consider for recommendation to a friend; and a peer-to-peer recommendation module operable to receive an indication from the first user that one or more of the presented media items are to be recommended to the friend, and to present the one or more indicated media items to the friend;

wherein receiving an indication from the first user comprises the user selecting the one or more media items from a list of media items having the highest predicted rating score for friend for a friend for which the friend hasn't rated the media item; and wherein at least one of the media recommendation module and peer-to peer recommendation module comprises program instructions executable on the processor.

8. A peer-to-peer media item recommendation system, comprising:

a processor;

a media recommendation module operable to present a selected list of media items to a first user to consider for recommendation to a friend; and a peer-to-peer recommendation module operable to receive an indication from the first user that one or more of the presented media items are to be recommended to the friend, and to present the one or more indicated media items to the friend;

wherein the one or more indicated media items are presented to the friend as a media item object in at least one of a message inbox, a recommended items list, and a friends' recommendations list; and wherein at least one of the media recommendation module and peer-to peer recommendation module comprises program instructions executable on the processor.

9. A peer-to-peer media item recommendation system, comprising:

a processor;

a media recommendation module operable to present a selected list of media items to a first user to consider for recommendation to a friend; and a peer-to-peer recommendation module operable to receive an indication from the first user that one or more of the presented media items are to be recommended to the friend, and to present the one or more indicated media items to the friend;

wherein receiving an indication from the first user that one or more of the presented media items are to be recommended to the friend comprises receiving an indication from the first user that the first user believes the media item would be enjoyed by the first user and the friend viewing the media item together;

wherein presenting the one or more indicated media items to the friend comprises presenting the one or more indicated items with a notation that the first user believes the media item would be enjoyed by the first user and the friend viewing the media item together; and wherein at least one of the media recommendation module and peer-to peer recommendation module comprises program instructions executable on the processor.

10. A peer-to-peer media item recommendation system, comprising:

a processor;

a media recommendation module operable to present a selected list of media items to a first user to consider for recommendation to a friend; and a peer-to-peer recommendation module operable to receive an indication from the first user that one or more of the presented media items are to be recommended to the friend, and to present the one or more indicated media items to the friend;

wherein presenting a selected list of media items to a first user to consider for recommendation to a friend comprises presenting a list of media items that a recommendation engine has scored as a good recommendation for both the friend and the first user; and wherein at least one of the media recommendation module and peer-to peer recommendation module comprises program instructions executable on the processor.

* * * * *